Figure 1:
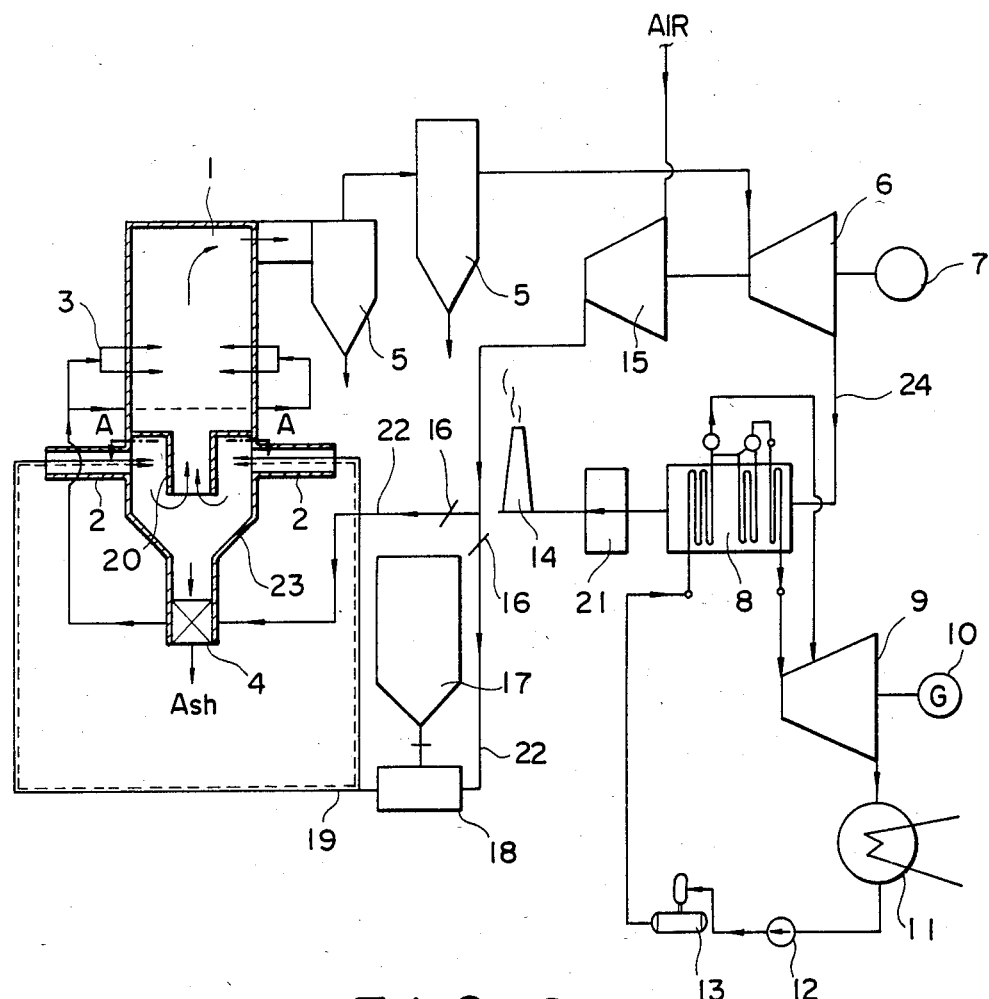

United States Patent [19]

Ishihara

[11] Patent Number: 4,590,868
[45] Date of Patent: May 27, 1986

[54] COAL-FIRED COMBINED PLANT
[75] Inventor: Takao Ishihara, Tokyo, Japan
[73] Assignee: Mitsubishi Jukogyo Kabushiki Kaisha, Tokyo, Japan
[21] Appl. No.: 704,374
[22] Filed: Feb. 22, 1985
[51] Int. Cl.$^4$ ............................................. F23D 1/00
[52] U.S. Cl. ................................. 110/347; 60/39.464; 60/39.5; 110/216
[58] Field of Search ............... 110/341, 347, 264, 265, 110/233, 234, 216; 60/39.464, 39.5, 39.02

[56] References Cited
U.S. PATENT DOCUMENTS
4,019,314  4/1977  Springmann ........................ 60/39.02
4,089,631  5/1978  Giles ................................ 110/347 X
4,462,205  7/1984  Giles et al. .................... 60/39.464 X Primary Examiner—Edward G. Favors
Attorney, Agent, or Firm—Toren, McGeady, Stanger, Goldberg & Kiel

[57] ABSTRACT

In a coal-fired combined plant, finely powdered coal is burned at high temperature in a pressurized coal-melting combustion furnace to obtain combustion gas substantially free of dust to drive a gas turbine in order to generate electric power. Waste gas from the gas turbine is used to produce steam which drives a steam turbine for additional electric power generation. Primary dust removal from the combustion gas is carried out by removing most of the resulting coal ash in a molten state. In a secondary dust removal, the dust is removed from the combustion gas by a cyclone disposed in the combustion furnace. In a tertiary dust removal, the dust is removed from the combustion gas which is discharged through an outlet at the combustion furnace by a precision dust-removing device.

3 Claims, 2 Drawing Figures

COAL-FIRED COMBINED PLANT

The present invention relates to a coal-fired combined plant, more specifically, to such a plant improved in efficiency.

Heretofore, as electric power generation systems employing a coal, there are (a) an electric power generation plant in which a boiler of a finely powdered coal combustion, a stoker combustion, a fluidized bed combustion system or the like and a steam turbine are combined, (b) a coal gasification composite electric power generation plant in which a coal gasifying furnace, a gas turbine and a steam turbine are combined, and the like. In recent years, much attention has been paid to the above-mentioned coal gasification composite electric power generation plant, since a high efficiency can be expected. That is to say, the constitution of the coal gasification composite electric power generation plant is as follows: The finely powdered coal treated by a pulverizer is converted into a gas in a coal-gasifying furnace; the resultant combustion gas is delivered as a high-temperature gas from the furnace to a gas turbine in order to generate electric power; the resultant waste-heat energy is utilized in a waste-heat boiler to produce steam, which is further used to drive a steam turbine for electric power generation.

In the above-mentioned coal-gasifying composite electric power generation plant, if a temperature of the gas to be introduced into the gas turbine is heighten, a higher efficiency can be obtained.

However, the combustible gas generated in the coal-gasifying furnace containes, in addition to main components such as CO, $H_2$ and hydrocarbons, a great deal of a dust, therefore such a gas cannot be used as a fuel for the gas turbine without any further treatment. For this reason, a dust removal is carried out by the use of a dust-removing device such as a cyclone. In the case, the coal gas will have a high temperature and pressure, so that the dust-removing device will tend to suffer thermal damage by the dust and it will be difficult to collect the dust. In consequence, it is prevalent that a temperature and pressure of the produced gas are decreased once in a boiler or the like; the dust is then removed therefrom; the gas is guided to the gas turbine, in which combustion and work of power generation are done; and the resultant waste gas is guided to the waste gas boiler.

In such a manner, since the high-temperature combustible gas is cooled once with the low-temperature vapor, the high-temperature energy of the valuable gas is not utilized effectively. Moreover, although such a conventional system is constituted very complicatedly, its efficiency is not sufficiently improved.

Accordingly, an object of the present invention is to provide a composite electric power generation plant having a higher efficiency than a conventional coal-gasifying composite electric power generation plant, the plant of the present invention being characterized by most suitably combining a gas turbine with a coal-fired combined plant.

That is to say, the present invention is connected with a coal-fired combined plant having a high treating efficiency in which most of, for example, 90 to 95% of coal ash is removed in a molten state from a high-temperature combustion gas in high-temperature and high-pressure ash-melting combustion furnaces in order to carry out a primary dust removal; the dust in the combustion gas is further removed therefrom by a cyclone disposed in a pressurizing coal combustion furnace in order to carry out a secondary dust removal; the dust in the high-temperature and high-pressure combustion gas at an outlet of the coal combustion furnace is furthermore removed therefrom in order to carry out a tertiary dust removal; the thus treated combustion gas is directly guided to a gas turbine; on the other hand, a temperature of the combustion gas at the outlet of the coal combustion furnace is adjusted to a predetermined level by mixing the combustion gas with secondary air; and the combustion gas is subjected to a heat exchange for the secondary air in a dust cooler disposed under the coal combustion furnace.

Figure 2:
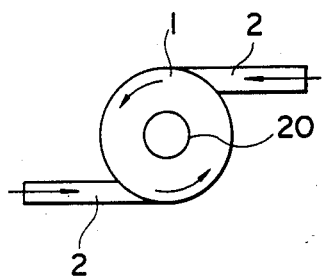

Now, the present invention will be described in detail as an example in reference to drawings, in which:

FIG. 1 is a flow sheet illustrating one embodiment of the present invention; and FIG. 2 is a sectional view taken along the line A—A in FIG. 1.

The constitution and function of the present invention are as follows:

Air in the atmosphere is compressed by an air compressor 15 coaxially connected to a gas turbine 6, up to a high pressure of 10 to 30 ata (atmosphere absolute), and a temperature of the compressed air reaches 250° to 500° C. by adiabatic compression effect. The thus regulated high-temperature and high-pressure air is divided into two portions and delivered to a high-pressure mill 18 and a secondary air jetting nozzle 3 through connecting pipes 22. This dividing proportion of the compressed air is decided in compliance with a flow rate necessary for drying and pulverization of a coal, and the dividing operation is carried out by a flow rate-dividing damper 16 provided in the connecting pipe 22.

In the high-pressure mill 18, the coal material introduced thereinto from a coal bunker 17 is pulverized to prepare the finely powdered coal and the latter is dried with the aid of the delivered high-temperature and high-pressure air, and by the function of the air, the fine coal powder is introduced into coal ash-melting combustion furnaces 2 through coal pipes 19 as shown by a dotted line in FIG. 1. The finely powdered coal is burned at a high temperature and high pressure in the coal ash-melting combustion furnaces 2 to produce a combustion gas. These coal ash-melting combustion furnaces 2 are connected to an undermentioned pressurizing coal combustion furnace 1 in a tangential direction to a furnace wall of the latter 1, as shwon in FIG. 2. The combustion gas is jetted from the coal ash-melting combustion furnaces 2 into a cyclone portion 20 disposed in the pressurizing coal combustion furnace 1, at a high speed in a tangential direction to a wall of the cyclone 20 as shown in FIG. 2. In this case, most of, i.e., 90 to 95% of a coal ash becomes a melting state in the coal ash-melting combustion furnaces 2, and the molten ash drops along the inner wall of the pressurizing coal combustion furnace 1 toward a lower hopper 23 in order to carry out a primary dust removal. An unmolten coal dust is removed from the combustion gas by the cyclone 20 and likewise drops to the lower hopper 23 in order to carry out a secondary dust removal. These dusts or ash having a high-temperature reach a dust cooler 4 disposed on the bottom of the lower hopper 23. and in the cooler 4, they are cooled by a heat exchange for secondary air which is guided to the secondary air-jetting nozzle 3 via the dust cooler 4, so that the dusts are regulated so as to have a suitable hardness and are discharged out.

On the other hand, the high-temperature and high-pressure combustion gas, in which the ash content has been removed by the coal ash-melting combustion furnaces 2 and the cyclone 20, moves toward the upper portion of the pressurizing coal combustion furnace 1, and is mixed with the high-pressure air introduced thereinto through the secondary air-jetting nozzle 3, so that a temperature of the combustion gas falls. A temperature of the gas, after the mixing step, is adjusted to a suitable value within the range of 1000° C. to 1200° C. in compliance with a tolerance of its temperature at an inlet of the gas turbine 6.

Afterward, the dust is further removed from the combustion gas by a precision dust-removing device 5 disposed at an outlet of the pressurizing coal combustion furnace 1, up to the dust concentration range which the gas turbine 6 can tolerate, i.e., several mg/Nm$^3$ or less, for example, the range of 10 to 5 mg/Nm$^3$, in order to carry out a tertiary dust removal. The high-temperature and high-pressure combustion gas in which the dust has substantially perfectly been removed is delivered to the gas turbine 6 and drives a power generator 7. Afterward, the combustion gas is transferred therefrom to a waste gas duct 24.

Next, the waste gas from the gas turbine 6 is delivered through the duct 24 to a waste-heat boiler 8, in which steam for driving a steam turbine 9 is produced. By driving the steam turbine 9, an S/T power generator 10 is rotated to produce electric power. The steam which has driven the S/T power generator 10 is discharged from the steam turbine 9, is condensed in a condenser 11, is delivered through a condensing pump 12 to a deaerating device 13, where the steam is deaerated, and is returned to the waste-heat boiler 8.

Furthermore, if necessary, a device 21 for desulfurizing and denitrating the waste gas may be successively provided on the waste gas duct 24, and the waste gas which has been desulfurized and denitrated by the device 21 is discharged out through a chimney 14.

Incidentally, needless to say, the above-mentioned coal-fired combined plant is required to have a structure capable of withstanding a high pressure, since air and the combustion gas to be handled therein have a high pressure. For example, the pressurizing coal combustion furnace 1 may be constituted in the form of a pressure-resistant container which is lined with a refractory material, bricks or the like and which can withstand a high pressure of 10 to 30 ata.

A proper air blow into the secondary air jetting nozzle 3 and the coal ash-melting combustion furnaces 2 permits denitrating the combustion gas to some extent even in the furnaces 1 and 2.

According to the coal-fired combined plant, constituted as described above, of the present invention, the following functional effects can be obtained:

(1) Since a high temperature and pressure which the coal combustion gas has are taken out directly as power for the turbine, the coal-fired combined plant of the present invention can keep up a higher plant efficiency than in a conventional thermal plant comprising a combination of the coal-fired boiler and the steam turbine generator, a coal-gasifying furnace plant and the like.

(2) The coal-fired combined plant of the present invention can be more simplified on the whole as compared with the coal-gasifying plant.

What is claimed is:

1. A coal-fired combined plant in which a finely powdered coal is carried to a combustion furnace by high-temperature and high-pressure air and is burned therein; the resultant combustion gas is delivered to a gas turbine, in order to generate electric power; by the utilization of the resultant exhaust gas, steam is produced; and electric power generation is carried out by a steam turbine with the aid of the produced steam, characterized in that high-temperature and high-pressure air and a finely powdered coal are introduced into coal ash-melting combustion furnaces, in which said finely powdered coal is burned at a high temperature to produce a combustion gas; most of the resultant coal ash is removed in a molten state from said combustion gas to carry out a primary dust removal; a dust in said combustion gas is removed therefrom by a cyclone disposed in a pressurizing coal combustion furnace to carry out a secondary dust removal; the removed dust is subjected to a heat exchange for secondary air in a dust cooler disposed on the lower portion of said pressurizing coal combustion furnace; a temperature of said combustion gas at an outlet of said pressurizing coal combustion furnace is adjusted to a predetermined level by mixing said combustion gas with said secondary air; the dust in said combustion gas discharged through the outlet of said pressurizing coal combustion furnace is removed therefrom by a precision dust-removing device in order to carry out a tertiary dust removal; and said combustion gas is then delivered to said gas turbine.

2. The coal-fired combined plant according to claim 1 wherein in the step of said primary dust removal, 90 to 95% of the coal ash is removed in a molten state from said combustion gas.

3. The coal-fired combined plant according to claim 1 wherein said coal ash-melting combustion furnaces are connected to said pressurizing coal combustion furnace in a tangential direction to a furnace wall of the latter furnace.

* * * * *